A. A. Sage,
Bread Machine,
Nº 40,284. Patented Oct. 13, 1863.
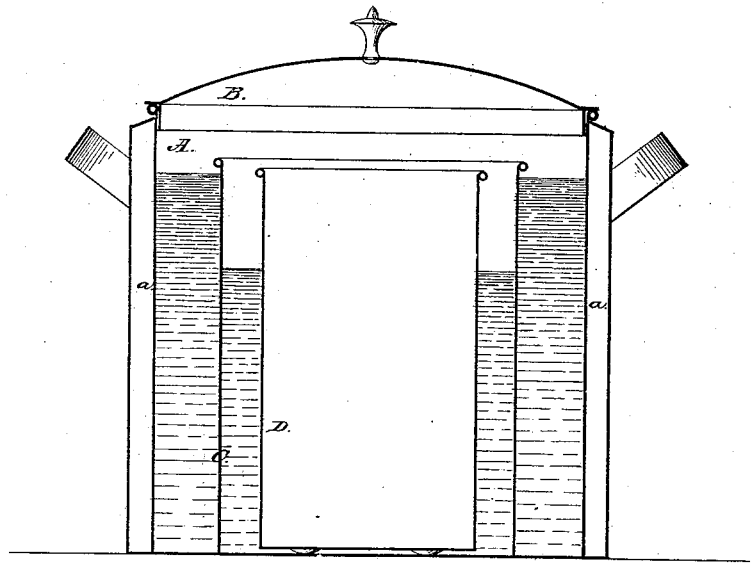
Attest:
J. W. Coombs
Geo. W. Reed
Inventor:
A. A. Sage
By Munn &
Atty's

UNITED STATES PATENT OFFICE.

A. A. SAGE, OF MEMPHIS, MICHIGAN.

IMPROVED DEVICE FOR RAISING YEAST.

Specification forming part of Letters Patent No. 40,284, dated October 13, 1863.

*To all whom it may concern:*

Be it known that I, A. A. SAGE, of Memphis, in the county of Macomb and State of Michigan, have invented a new and useful Apparatus or Device for Raising Yeast, and which I term a "Yeast-Riser;" and I do hereby declare that the following is a full, clear, and exact description of the same, reference being had to the accompanying drawing, making a part of this specification, said drawing being a vertical central section of my invention.

The object of this invention is to obtain a simple and economical apparatus or device, by which yeast may be raised without the aid of a fire, and thereby obviate the trouble and inconvenience of a fire in warm weather for the purpose specified.

To this end the invention consists in the employment or use of a vessel or cup, in which the yeast, prepared in the usual way, is placed, said vessel or cup being placed within a vessel or cup of larger diameter, and the latter permanently secured within a case provided with double walls and considerably larger in diameter than the vessel or cup which contains the yeast-cup, all being arranged in such a manner as to accomplish the result with the aid of hot water, as hereinafter described.

To enable those skilled in the art to fully understand and construct my invention, I will proceed to describe it.

A represents a case or vessel, which may be of cylindrical form and constructed of sheet metal, with double walls, having a dead-air space, *a*, between them. B is the cover of the case or vessel.

Within the case or vessel A there is permanently secured a cup or vessel, C, which has a single wall only, and is considerably smaller in diameter than the case or vessel A, and within the cup or vessel C there is placed a cup or vessel, D, which is somewhat smaller in diameter than C, and is not in any way attached either to A or C, it being loose, so as to be capable of being removed from C and fitted therein at will. The cups or vessels C D are not provided with covers.

The apparatus or device is used as follows: The removable cup or vessel D contains the yeast, which is prepared in the usual way, and the cup or vessel C has a quantity of tepid or milk-warm water poured into it. The cup or vessel D is then placed in C, and the case A is then nearly filled with water at nearly the boiling temperature. The lid or cover B is then placed on A, and the water in A soon increases the heat of the water in C, the radiation of heat from A being retarded by the double walls. Thus the yeast in D will be subjected to a proper temperature a sufficient length of time to cause it to "rise," as it is commonly termed. The outer wall of the case A may have a small hole made in it at its upper part to admit of the escape of the rarefied air.

By this simple and economical device a fire is avoided, which is a great trouble and attended with considerable inconvenience in summer. All that is required is to set the device in the evening on retiring and the yeast will be ready for use in the morning.

Having thus described my invention, what I claim as new, and desire to secure by Letters Patent, is—

An apparatus or device for raising yeast, composed of the case or vessel A, provided with double walls, in connection with the cups or vessels C D, placed within A, and all arranged substantially as specified.

A. A. SAGE.

Witnesses:
   C. D. STARR,
   O. GRANGER.